3,636,085
PERFLUOROALKYLSULFONAMIDO - ALKYL ESTERS OF FUMARIC ACID AND OTHER ETHYLENICALLY UNSATURATED POLYBASIC ACIDS AND POLYMERS THEREOF
Eduard Karl Kleiner, New York, N.Y., assignor to Ciba-Geigy Corporation, Greenburgh, N.Y.
No Drawing. Filed Apr. 1, 1969, Ser. No. 812,439
Int. Cl. C07c 69/52, 69/60
U.S. Cl. 260—485 F
19 Claims

ABSTRACT OF THE DISCLOSURE

Monomeric perfluoroalkylsulfonamido-alkyl esters of fumaric, maleic, citraconic, mesaconic, itaconic, aconitic, and methylene malonic acid form homopolymers and form copolymers with other ethylenically unsaturated comonomers. The polymers obtained have valuable soil repellent properties and are therefore especially useful in textile finishes. A preferred compound exemplified is bis[2-(N-ethyl-n-perfluorooctanesulfonamido)ethyl] itaconate.

The invention relates to novel monomers and the polymers which may be prepared from them. The resulting polymers possess excellent soil repellent properties. These polymers provide oil and water repellent finishes useful to treat materials such as textiles, paper, leather, painted wooden and metallic surfaces and the like.

The monomer compounds of the present invention are of the following formula:

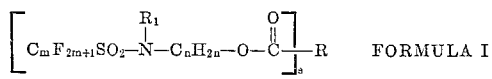

FORMULA I wherein $m$ is an integer of 3 to 14, preferably 6 to 10, and most preferably 8;
$n$ is an integer of 2 to 11, and is preferably 2;
$R_1$ is alkyl of 1 to 4 carbon atoms, and preferably is ethyl;
R is an ethylenically unsaturated radical derived from fumaric, maleic, citraconic, mesaconic, itaconic, aconitic, or methylene malonic acid, preferably itaconic or fumaric, most preferably itaconic; and
$s$ is an integer of 2 to 3 and is equal to the number of carboxyl groups of the acid from which R is derived, preferably being 2 to correspond to the preferred fumaric and itaconic acids.

The corresponding polymers of the monomers of this invention are those having a skeletal chain comprising repeating units of

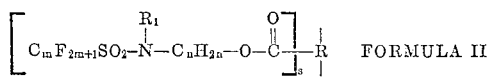

FORMULA II wherein $m$, $n$, $R_1$, R and $s$ have the same meanings as given in Formula I.

Particularly preferred embodiments of the present invention are polymers of the monomer compounds which are fumarates and itaconates and wherein $R_1$ is methyl and ethyl, $n$ is 2, and $m$ is 6 to 10, most preferably averaging about 8. Itaconates are generally the most desirable.

As indicated, perfluoro groups of three to fourteen carbon atoms may be employed and it is of course understood that mixtures of compounds of perfluoro groups of different numbers of carbon atoms within the foregoing range may be employed.

It has been observed that, in general, as the length of $R_1$ is increased, the melting point of the monomer is decreased. As the melting point of the monomer decreases, the solubility of the monomer in solvents suitable for polymerization increases. Conversely, monomers wherein $R_1$ is hydrogen are much less soluble and generally have melting points of over 200° C. and thus are relatively more difficult to polymerize. In contrast to this, however, the best repellencies are obtained with polymers for monomers wherein $R_1$ is small; preferably in this regard $R_1$ should be no larger than ethyl.

The monomer compounds of the above Formula I may be prepared by various procedures known to those skilled in the art.

A generally suitable method comprises reacting a perfluoroalkanesulfonyl fluoride with an appropriate alkylamine to produce N-alkylperfluoroalkanesulfonamides. The N-alkyl perfluoroalkanesulfonamide is then converted to the sodium or potassium salt and this in turn is reacted with an alkylene halohydrin to yield N-alkyl, N-alkanolperfluoroalkanesulfonamides. The N-alkanol product is then reacted with the appropriate acid chloride to give the desired esters. Detailed methods for the synthesis of the N-alkylperfluoroalkanesulfonamides are disclosed in U.S. 2,732,398 and for the N-alkyl-N-alkanol-n-perfluoroalkanesulfonamides in U.S. 2,803,615.

The esters of methylene malonic acid generally require a two step synthesis. The intermediate malonesters are made using one of the above esterification techniques and then the methylene malonic ester is formed for example by condensation of the malonester with formaldehyde. See E. Haworth and W. H. Perkin, J. Chem. Soc., 73, 339–345 (1898).

The polymers contemplated by the present invention include homopolymers of the novel fluoromonomers, copolymers with other ethylenically unsaturated monomers, and physical blends of such homopolymers and copolymers together and/or with other polymers.

Since the novel homopolymers and copolymers find substantial use as textile finishes, it is an advantage to include in the monomer mixture from about 0.2 to about 5% by weight of a reactive acrylic, which permits crosslinking either by heat or crosslinking agents. Such reactive fluorocopolymers give textile finishes with superior resistance to washing, dry cleaning, scrubbing, abrasion, and crushing, both wet and dry, and also a better durability of the oil and water repellency properties.

It is also uniquely advantageous, especially in the preparation of fabric finishes, to use blends of emulsions or solutions of the instant fluorinated polymers with emulsions or solutions of other polymers such as polyalkyl acrylates and polyalkyl methacrylates, illustrative of which is poly (n-octyl methacrylates).

Polymerization of the monomers may be carried out in bulk, solution, or emulsion. The preferred polymerization techniques are emulsion polymerization in an aqueous medium and solution polymerization.

In emulsion polymerization, the monomer or monomers to be polymerized are emulsified together in a water solution of a surface active agent to a given monomer concentration of from about 5% to about 50%. Usually the temperature is raised to between 40° C. and 70° C. to effect polymerization in the presence of an added catalyst. A suitable catalyst may be any one of the commonly known water soluble agents for initiating the polymerization of an ethylenically unsaturated compound. The concentration of the catalyst for the polymerization is usually between 0.1% and 2% based upon the weight of the monomers.

Suitable surfactants or emulsifying agents include cationic, anionic or non-ionic types. Since the cationic types can be used in most textile treating baths, they are preferred. The hydrophobic portion of the surfactant may be hydrocarbon or fluorinated hydrocarbon.

Suitable surfactants that may be used include, for example, non-ionic surfactants in which the hydrophilic group is a poly(ethoxy) group and the hydrophobic portion is either a hydrocarbon or a fluorocarbon group such as the ethylene oxide condensates of alkyl phenols, alkanols, alkylamines, alkylthiols, alkylcarboxylic acids, fluoroalkyl carboxylic acids, fluoroalkyl amides and the like.

Suitable cationic surfactants include for example quaternary ammonium salts or amine salts containing at least one long chain alkyl, fluoroalkyl, or high alkyl substituted benzene or naphthalene group to provide the hydrophobic portion.

Polymerization is preferably carried out for a reaction period adjusted to obtain essentially quantitative conversion of the fluorinated monomer. The optimum reaction time will depend upon the catalyst used and the polymerization temperature and other conditions, but will generally be in the range of from 0.5 to 24 hours.

The polymerization temperature will depend upon the catalyst chosen. In the case of emulsion polymerization in aqueous media, it will generally be in the range of from 40° to 90° C. The polymerization is generally most conveniently and preferably carried out at atmospheric pressure wherever possible.

In solution polymerization, the monomer or monomers are dissolved in a suitable solvent such as fluorinated solvents, for example, fluorohalogenated hydrocarbons, hexafluoroxylene, trifluorotoluene or mixtures thereof with actone and/or ethylacetate, other fluorinated solvents and the like, and then polymerized in a reaction vessel using initiators such as azobisisobutyronitrile or benzoyl peroxide at concentrations of 0.1 to 2.0% at 40–100° C. under nitrogen.

As mentioned, besides homopolymers, valuable copolymers are obtained by polymerization of the foregoing novel perfluorinated monomers with other polymerizable monomers having ethylene unsaturation.

As a general rule, the preferred comonomer units should have short side chains, since the comonomers with longer side chains generally tend to decrease the soil repellency level.

Examples of suitable comonomers are alkyl vinylethers, such as methyl vinyl ether, isopropyl vinyl ether, isobutyl vinyl ether, 2-methoxyethyl vinyl ether, n-propyl vinyl ether, t-butyl vinyl ether, isoamyl vinyl ether, n-hexyl vinyl ether, 2-ethylbutyl vinyl ether, diisopropylmethyl vinyl ether, 1-methylheptyl vinyl ether, n-decyl vinyl ether, n-tetradecyl vinyl ether, and n-octadecyl vinyl ether.

Vinyl comonomers with short side chains are preferred. Of all these vinyl ethers, the most preferred ones are: methyl vinyl ether, ethyl vinyl ether, n-propylvinyl ether, isopropyl vinyl ether, 2-methoxyethyl vinyl ether and 2-chloroethyl vinyl ether.

Propylene, butylene and isobutylene are preferred α-olefins useful as comonomers with the novel fluoro monomers of the present invention. Straight and branched chain α-olefins are useful with up to 18 carbon atoms in the side chain.

Useful copolymers of the novel perfluorinated compounds of the invention are formed with vinyl esters, e.g. vinyl acetate, vinyl esters of substituted acids, such as for example, vinyl methoxyacetate, vinyl trimethylacetate, vinyl isobutyrate, isopropenyl butyrate, vinyl lactate, vinylcaprylate, vinyl pelargonate, vinyl myristate, vinyl oleate and vinyl linoleate; vinyl esters of aromatic acids, such as vinyl benzoate, and vinyl alkoxybenzoates.

Preferred of the foregoing vinyl esters are vinyl acetate, vinyl propionate, vinyl benzoate, and isopropenyl acetate.

Also useful as comonomers are styrene and related monomers which copolymerize readily with the novel esters of this invention such as o-methylstyrene, p-methylstyrene, 3,4-dimethylstyrene, 2,4,6-trimethylstyrene, m-ethylstyrene, 2,5-diethylstyrene.

Additional useful comonomers are ethylene and chloro-, fluoro- and cyano-derivatives of ethylene such as vinyl chloride, vinylidene chloride, vinyl fluoride, vinylidene fluoride, acrylonitrile, methacrylonitrile, tetrafluoroethylene, trifluorochloroethylene, hexafluoropropylene; acrylate and methacrylate monomers, particularly those with 1 to 18 carbon atoms in the ester groups such as n-propyl methacrylate, methyl methacrylate, t-butyl methacrylate, n-butyl methacrylate, methyl acrylate, ethyl acrylate, propyl acrylate, butyl acrylate, octyl acrylate, tetradecyl acrylate, s-butyl acrylate, 2-ethylhexyl acrylate, 2-methoxyethyl acrylate, and phenyl acrylate; dienes particularly 1,3-butadiene, isoprene, and chloroprene, 2-fluorobutadiene, 1,1,3 - trifluorobutadiene, 1,1,2,3 - tetrafluoro butadiene, 1,1,2-trifluoro-3,4-dichloro-butadiene, and tri- and pentafluoro butadiene and isoprene; nitrogen-vinyl monomers such as vinyl pyridine, N-vinylimides, amides, and secondary cyclic amines, like vinyl succinimide, vinyl pyrrolidone, N-vinyl carbazole and the like.

Also useful as comonomers with the novel monomers of the present invention are vinyl monomers which contain perfluorinated side chains. Examples of such perfluorinated monomers are vinyl ethers of the type disclosed in U.S. 2,732,370 and U.S. 2,828,025; vinyl esters containing fluorinated alkyl groups disclosed in U.S. 2,592,069 and U.S. 2,436,144. Other useful monomers are acrylates and methacrylates and derivatives thereof such as those disclosed in U.S. 2,628,958; U.S. 3,256,230; U.S. 2,839,513; U.S. 3,282,905; U.S. 3,252,932 and U.S. 3,304,278.

As mentioned, it may also be desirable to include a minor amount of other reactive comonomers in order to improve the wash and dry-clean properties of the novel textile finishes obtained according to the practice of this invention. Such monomers act as cross-linking agents during the curing operation. Such reactive comonomers are generally employed in amounts of 0.1 to 2%. By way of illustration, reactive monomers which may be included are: acrylic acid, methacrylic acid, acrylamide, methacrylamide, N-methylolacrylamide, 2-hydroxyethyl methacrylate or acrylate, hydroxypropyl acrylate or methacrylate, and t-butylaminoethyl methacrylate or glycidyl methylate. Of the foregoing, N-methylolacrylamide and 2-hydroxyethyl methacrylate are preferred.

Coatings of the homopolymers and copolymers according to the present invention can be prepared and applied from solvent solutions or from aqeuous emulsions. Suitable solvents are fluoroalkanes, fluorochloroalkanes, fluoroalkyl-substituted aromatics, alkyl esters of perfluoroalkanoic acids, chlorinated alkanes or aromatics, hydrocarbon aromatics, ketones, esters and ethers. Especially useful as solvents are the fluorinated liquids, and especially α,α,α-trifluorotoluene, otherwise known as benzotrifluoride, hexafluoroxylene and mixtures of these with ethyl acetate or acetone and the like. Concentrations of the fluorinated polymers of the present invention in solvents to provide coatings with effective oil and water repellency properties will generally be of the order of 0.01 to 10% and preferably from 0.1 to 2.0% by weight.

Blends of the emulsions of the polymers of this invention with blended emulsions of other polymers and copolymers are particularly useful in textile finishes.

The other polymers and copolymers are generally of a non-fluorinated type; however, other fluorinated polymers and copolymers may be used if desired.

Non-fluorinated polymers useful in such blends, include for example, but without limitation, polymers and copolymers of alkyl acrylates and alkyl methacrylates, such as methyl methacrylate, ethyl methacrylate, hexyl methacrylate, and n-octyl methacrylate. A particularly suitable polymer is poly (n-octyl methacrylate).

Also useful are polymers and copolymers of acrylic acid, methacrylic acid, styrene, alkyl styrene, butadiene, 2-methyl-1,3-butadiene, 2-chloro-1,3-butadiene; polymers and copolymers of vinyl esters such as vinyl acetate, vinyl butyrate, vinyl laurate, vinyl stearate, vinyl 2-ethyl-hexanoate; polymers and copolymers of vinyl halides and vinylidene halides, such as vinyl chloride, vinylidene chloride, vinyl fluoride, vinylidene fluoride; polymers and copolymers of allyl esters such as allyl propionate, or allyl caprylate; polymers and copolymers of vinyl ketones, such as vinyl methyl ketone, vinyl ethyl ketone, and the like; polymers and copolymers of vinyl ethers such as methyl vinyl ether, cetyl vinyl ether, and the like; polymers and copolymers of acrylamide, methacrylamide, N-methylol acrylamide, N-methylol methacrylamide, N-isopropyl acrylamide, and acrylonitrile and methacrylonitrile.

For example, from about 20 to 97% by weight of a homopolymer of poly(n-octyl methacrylate) blended with the polymers of this invention provides very useful coating compositions which retain surprisingly high repellency ratings even though the relative amount of perfluorinated polymer of this invention is relatively low. Of course, it is understood that besides application to textiles, the coatings of the perfluorinated polymers of the present invention are useful in providing oil and water repellent coatings for leather, paper, wood, masonry, metals, plastics, glass, painted surfaces, and the like. Coatings may be readily applied by various coating techniques, such as those familiar to the art, such as dipping, spraying, brushing, padding, roll coating, and the like.

For evaluation purposes, the textile material in the following examples was dipped in the bath comprising the polymer to be evaluated and the amount of the retained solution adjusted so as to leave approximately 2% of polymer by weight of the fabric on the fabric. The fabric is dried at room temperature and then cured in an oven at a temperature of about 175° C. for about 2 minutes.

The type of textile material which is coated is not critical. For evaluation purposes, repellency ratings for cotton or wool are determined as a standard screening procedure; however, such fibers such as fiber glass, silk, regenerated cellulose, cellulose esters and ethers, polyamides, polyesters, polyacrylonitrile, polyacrylates and other fibers alone or blended or in combination may be coated with the polymers of the present invention.

In the examples below, the repellency ratings were determined as follows:

The AATCC water spray test rating was determined according to Standard Test method 22–1966 of the American Association of Textile Chemists and Colorists, XXXVII, 1961, p. 1952 (also designated ASTM–D 583–58).

Oil repellency is measured by the 3–M–Oil test procedure of Grajek and Peterson, Textile Research Journal, April 1962, p. 323.

The cotton/polyester fabric referred to in the evaluations is a 65% polyester-35% cotton blend. The polyester is one formed from ethylene glycol and terephthalic acid, sold for example under the Dacron trademark.

The following examples describing certain representative embodiments of this invention will serve to further illustrate the nature of this invention. Unless otherwise specified, the relationship of parts by weight to parts by volume is that of grams to cubic centimeters, and temperatures are degrees centigrade.

EXAMPLE 1

Bis[2-(N-ethyl-n-perfluorooctanesulfonamido) ethyl] fumarate (a) N-ethyl - n - perfluorooctanesulfonamide.—18.4 g. (0.4 mole) of ethylamine is dissolved in 300 ml. of anhydrous ether which has been cooled to −30° C. The solution is then warmed to −5° C. and 50.2 g. (0.1 mole) of perfluorooctanesulfonyl fluoride added over a period of 45 minutes with stirring. During the addition and for two hours afterward, the temperature is maintained at 0° C. Thereafter the temperature is allowed to rise to room temperature and the reaction mixture is filtered. The filtrate is evaporated on a rotary evaporator (11 mm. Hg) and the residue crystallized from benzene. The N-ethyl-n-perfluorooctanesulfonamide is obtained as white flakes with a melting point of 87–88.5° C.

(b) N - ethyl - N - ethanol - n - perfluorooctanesulfonamide.—To 52.7 g. (0.1 mole) of N-ethyl-n-perfluorooctanesulfonamide dissolved in 80 g. of absolute methanol, there is added dropwise over a 30 minute period a solution of 5.4 g. (0.1 mole) of sodium methoxide in 15 g. of absolute alcohol. The reaction mixture was stirred for 1.5 hours and the methanol evaporated, leaving the sodium salt as a soft waxy solid. 54.9 g. (0.1 mole) of the sodium salt of N-ethyl-n-perfluorooctanesulfonamide and 8.1 g. of 2-chloroethanol are heated together at 105–115° C. for 6 hours and then the reaction mixture allowed to cool to room temperature. The resulting solid is extracted with 800 ml. ether, the extract washed with 500 ml. water, then 500 ml. of aqueous sodium hydroxide, and with water until washes are neutral. The ether layer is then dried over anhydrous sodium sulfate and the ether evaporated, leaving a solid residue which is distilled yielding 38.2 g. of N-ethyl-N-ethanol-n-perfluorooctanesulfonamide. (B.P. 125–130° C./0.7 mm. Hg.)

(c) Bis[2 - (N - ethyl - n - perfluorooctanesulfonamido)ethyl] fumarate.—57.1 g. (0.1 mole) of N-ethyl-N-ethanol-n-perfluorooctanesulfonamide are charged to a flask with 7.65 g. (0.05 mole) of fumaryl chloride and 150 g. of anhydrous benzene and the reaction mixture refluxed for 70 hours, the reaction being monitored by VPC. The reaction mixture is cooled, and the precipitate which forms is filtered and then washed with benzene. The white solid obtained is crystallized from acetone, yielding 26.7 g. of bis[2-(N-ethyl-n-perfluorooctanesulfonamido)ethyl] fumarate, melting at 112–112.5° C.

Analysis.—Calcd. for $C_{28}H_{20}F_{34}N_2O_8S_2$ (percent): C, 27.51; H, 1.65; F, 52.84; N, 2.29. Found (percent): C, 27.50; H, 1.70; F, 53.00; N, 2.36.

EXAMPLE 2

Bis[2-(N-methyl-n-perfluorooctanesulfonamido)ethyl] fumarate

The general procedure followed in Example 1 is repeated, but employing a stoichiometrically equivalent amount of methylamine as starting material in place of the ethylamine of Example 1 with the corresponding intermediates and final product obtained as follows:

(a) N-methyl-n-perfluorooctanesulfonamide, melting at 101–103° C.
(b) N-methyl-N-ethanol-n-perfluorooctanesulfonamide, melting at 109.5–110.5° C.
(c) Bis[2 - (N - methy - n- perfluorooctanesulfonamido) ethyl] fumarate, melting at 190–192° C. crystallized from trifluorotoluene.

Analysis.—Calcd. for $C_{26}H_{16}F_{34}N_2O_8S_2$ (percent): C, 26.14; H, 1.35; F, 54.08; N, 2.35; S, 5.37. Found (percent): C, 25.91; H, 1.43; F, 54.41; N, 2.62; S, 5.88.

EXAMPLE 3

Bis[2-(N-n-propyl-n-perfluorooctanesulfonamido) ethyl] fumarate

In a similar manner using propylamine in place of ethylamine the following intermediates and final product are obtained:

(a) N-n-propyl-n-perfluorooctanesulfonamide, melting at 84–85.5° C.
(b) N-n-propyl-N-ethanol-n-perfluorooctanesulonamide, boiling point 130–135° C./0.8 mm. Hg
(c) Bis[2 - (N - n - propyl - n - perfluorooctanesulfonamido)ethyl] fumarate, melting at 97–98° C. crystallized from benzene-methanol.

Analysis.—Calcd. for $C_{30}H_{24}F_{34}N_2O_8S_2$ (percent): C, 28.81; H, 1.93; F, 51.65; N, 2.24; S, 5.13. Found (percent): C, 28.73; H, 2.13; F, 53.06; N, 2.45; S, 6.13.

EXAMPLE 4

Bis[2-(N-n-butyl-n-perfluorooctanesulfonamido)ethyl] fumarate

Also following the general procedure of Example 1 using butylamine in place of ethylamine, the following intermediates and final product are obtained:

(a) N-n-butyl-n-perfluorooctanesulfonamide, melting at 77.5–78.5° C.
(b) N-n-butyl-N-ethanol-n-perfluorooctanesulfonamide, boiling point 128–130° C./0.6 mm. Hg
(c) Bis[2-(N-n-butyl-n-perfluorooctanesulfonamide)ethyl] fumarate, melting at 83–83.5° C.

Analysis.—Calcd. for $C_{32}H_{28}F_{34}N_2O_8S_2$ (percent): C, 30.06; H, 2.21; F, 50.52; N, 2.19; S, 5.01. Found (percent): C, 30.02; H, 2.37; F, 51.62; N, 2.26; S, 5.68.

EXAMPLES 5–8

In these examples, the intermediates N-alkyl-N-ethanol-n-perfluorooctane sulfonamides obtained in steps (b) of Examples 1–4 are reacted with stoichiometrically equivalent amounts of itaconyl chloride in lieu of fumaryl chloride and there are obtained the corresponding esters of itaconic acid:

EXAMPLE 5

Bis[2 - (N - ethyl - n - perfluorooctanesulfonamido)ethyl] itaconate, melting at 99.5–100.5° C.

EXAMPLE 6

Bis[2 - (N - methyl - n - perfluorooctanesulfonamido)ethyl] itaconate, melting at 151–152° C.

Analysis.—Calcd. for $C_{27}H_{18}F_{34}N_2O_8S_2$ (percent): C, 26.83; H, 1.50; F, 53.45; N, 2.32; S, 5.31. Found (percent): C, 26.73; H, 1.60; F, 55.39; N, 2.59; S, 5.86.

EXAMPLE 7

Bis[2-(N - n - propyl - n - perfluorooctanesulfonamido)ethyl] itaconate, melting at 53–54° C.

Analysis.—Calcd. for $C_{31}H_{26}F_{34}N_2O_8S_2$ (percent): C, 29.44; H, 2.07; F, 51.08; N, 2.22; S, 5.07. Found (percent): C, 29.06; H, 2.19; F, 51.24; N, 2.61; S, 5.89.

EXAMPLE 8

Bis[2-(N-n-butyl-n-perfluorooctanesulfonamido)ethyl] itaconate, melting at 47.5–49° C.

EXAMPLE 9

Following the general methods described above and employing stoichiometrically equivalent amounts of the appropriate starting materials which are generally commercially available or may be prepared by known methods by those skilled in the art, the following compounds of Formula I are obtained.

$$\left[ C_mF_{2m+1}SO_2-N-C_nH_{2n}-O-\overset{O}{\overset{\|}{C}}-\right]_s R$$

with $R_1$ on the N.

| $C_mF_{2m+1}$ | $R_1$ | s | R derived from— |
|---|---|---|---|
| a. $CF_3(CF_2)_6$ | $CH_3$ | 3 | Aconitic acid. |
| b. $CF_3(CF_2)_5$ | $CH(CH_3)_2$ | 2 | Fumaric acid. |
| c. $CF_3(CF_2)_7$ | $CH_2CH_3$ | 2 | Maleic acid. |
| d. $(CF_3)_2CF(CF_2)_4$ | $C(CH_3)_3$ | 2 | Mesaconic acid. |
| e. $CF_3(CF_2)_{12}$ | $CH_2CH_2CH_3$ | 2 | Itaconic acid. |
| f. $CF_3(CF_2)_2$ | $CH_2CH_3$ | 2 | Methylene malonic acid. |
| g. $CF_3(CF_2)_{10}$ | $CH_2CH_2CH_3$ | 2 | Itaconic acid. |
| h. $(CF_3)_2CF(CF_2)_{16}$ | $CH_2CH_3$ | 2 | Do. |
| i. $(CF_3)_2CF[CF_2CF(CF_3)]_2$ | $CH_3$ | 2 | Maleic acid. |
| j. $CF_3[CF_2CF(CF_3)]_2$ | $CH_2CH_3$ | 2 | Fumaric acid. |
| k. $CF_3(CF_2)_2$ | $CH_2CH_3$ | 2 | Itaconic acid. |

EXAMPLES 10–14

In the following examples, 100 parts of the indicated monomer prepared according to one of the preceding examples, 2 parts of the initiator indicated in the following Table I and in the case of solution polymerization, from about 100 to about 200 parts of a fluorinated solvent as indicated in Table I, are sealed under nitrogen in an ampul and polymerized for 16 hours at the temperatures indicated in Table I. The resulting homopolymers are purified by forming 10% by weight solutions in hexafluoroxylene which are precipitated with vigorous stirring in 20 times the amount of methanol. The precipitated polymers are then filtered and dried under vacuo. The yields in each case are indicated in Table I.

TABLE I

| Example No. | Fluoro monomer of | Initiator | Solvents (parts) | Polymerization temp., ° C. | Polymer yield, percent |
|---|---|---|---|---|---|
| 10 | Example 1 | t-Butyl perbenzoate | Hexafluoroxylene (200) | 130 | 68.6 |
| 11 | Example 2 | do | None [1] | 120 | 58.2 |
| 12 | Example 4 | 1,1'-azodicyclohexanecarbonitrile | do.[1] | 80 | 63.0 |
| 13 | Example 5 | do | Trifluorotoluene (200) | 105 | 81.0 |
| 14 | Example 6 | do | None [1] | 100 | 58.0 |

[1] Bulk polymerization.

The homopolymers obtained in Examples 10–14 are applied to test fabrics forming a 2% solution in hexafluoroxylene or any other suitable solvent, thus providing a fabric coating of 2% by weight of the fabric. A blend of 40% homopolymer and 60% poly(n-octyl methacrylate) in a 2% solution of hexafluoroxylene is employed in several instances as indicated in the following Table II. The repellency ratings are then determined using the tests described above and results are shown in Table II.

TABLE II

| Example No. | Fluoro monomer of | Repellency (2% polymer on fabric) | | | Appearance | Differential thermal analysis | |
|---|---|---|---|---|---|---|---|
| | | F | 3-M-Oil Test | AATCC H₂O Test | | $T_g$ (° C.) | $T_m$ (° C.) |
| 10 | Example 1 | C | 120 | 70 | White, brittle | (¹) | +124 |
| | | W | 130 | — | | | |
| | | C/D | 130 | 80 | | | |
| 11 | Example 2 | C | 110 (110) | 70 (70) | Sl. yellow brittle | +23 | +56 |
| | | W | 120 (110) | — | | | |
| | | C/D | 120 (120) | 70 (70) | | | |
| 12 | Example 4 | C | 100 | 50 | White, soft, sl. stacky | −5 | +37 |
| | | W | 110 | 70 | | | |
| | | C/D | 100 | — | | | |
| 13 | Example 5 | C | 130 (120) | 70 (70) | White, brittle | (¹) | +120 |
| | | W | 120 (140) | — | | | |
| | | C/D | 130 (120) | 70 (80) | | | |
| 14 | Example 6 | C | 100 (100) | 70 (70) | do | +14 | +45 |
| | | W | 90 (110) | — | | | |
| | | C/D | 100 (100) | 70 (70) | | | |

[1] Not distinct.

NOTE.—The ratings indicated in parenthesis are obtained employing a blend of 40% homopolymer and 60% poly(n-octyl methacrylate).

EXAMPLES 15-30

In each of these examples, 100 parts of a mixture of equimolar amounts of a fluorinated monomer of Examples 1-8 and methylvinylether or vinyl acetate, 2 parts of 1,1'-azodicyclohexanecarbonitrile and 300 parts of hexafluoroxylene were sealed in an ampul under nitrogen and polymerized at 100° C. except where indicated otherwise in the following Table III, for 16 hours. A 10% by weight of polymer solution in hexafluoroxylene was then prepared and precipitated under vigorous stirring into 20 times the amount of methanol. The copolymers were filtered and vacuum dried. Yields in each case exceeded 80%.

The copolymers were then applied from a 2% hexafluoroxylene solution to test fabrics and the repellency value determined, the results being shown in Table III.

EXAMPLES 31-35

The monomer bis[2-(N-ethyl-n-perfluorooctanesulfonamido)ethyl] fumarate prepared according to Example 2 is copolymerized with the comonomers as indicated in following Table IV using the general polymerization procedure of the previous examples but employing 2,2'-azobisisobutyronitrile as the initiator in each case and 200 parts of hexafluoroxylene. The yields exceeded 80% in each instance.

The polymers are applied to fabrics from a 2% hexafluoroxylene solution and the repellency values measured. The physical description of the copolymers and the results of the repellency tests are shown in Table IV.

| Example No. | Comonomers | Repellency F | 3-M-Oil Test | AATCC H₂O Test | Appearance of Polymer | Differential thermal analysis $T_g$(° C.) | $T_m$(° C.) | Calculated C | Calculated H | Found C | Found H |
|---|---|---|---|---|---|---|---|---|---|---|---|
| 31 | Monomer of Example 2 and CH₂=CHOCH₂CH₂OCH₃ | C / W / C/D | 100 / 90 / 110 | 70 / / 80 | White, brittle | +49 | +49 | 29.92 | 2.28 | 29.41 | 2.36 |
| 32 | Monomer of Example 2 and CH=CHOCOC₆H₅ | C / W / C/D | 90 / 90 / 100 | 70 / / 80 | do | +53 | +88 | 32.42 | 2.06 | 31.76 | 2.26 |
| 33 | Monomer of Example 2 and CH₂=C(CH₃)₂ | C / W / C/D | 110 / 90 / 110 | 50 / / 70 | do | (¹) | +64 | 30.06 | 2.21 | 30.24 | 2.11 |
| 34 | Monomer of Example 2 and CH₂=CHC₆H₅ | C / W / C/D | 100 / 100 / 110 | 70 / / 70 | do | (¹) | +95 | 32.59 | 2.13 | 33.24 | 2.42 |
| 35 | Monomer of Example 2 and CH₂=CHN(CH₂—CH₂)(CO—CH₂) | C / W / C/D | 90 / 90 / 90 | 70 / / 70 | do | (¹) | (¹) | 30.62 | 2.19 | 30.78 | 2.37 |

¹ Not distinct.

EXAMPLES 36 AND 37

The monomer bis[2-(N-methyl-n-perfluorooctanesulfonamido)ethyl] itaconate prepared according to Exam-

TABLE III

| Example No. | Comonomers | Repellency F | 3-M-Oil test | AATCC H₂O test | Appearance of polymer | Differential thermal analysis $T_g$(° C.) | $T_m$(° C.) | Calculated C | Calculated H | Found C | Found H |
|---|---|---|---|---|---|---|---|---|---|---|---|
| 15 | Monomer of Example 2 and CH₂=CHOCH₃ | C / W / C/D | 100 (100) / 110 (120) / 100 (110) | 70 (70) / / 70 (70) | White brittle | Not distinct | +87 | 29.07 | 2.05 | 29.32 | 2.15 |
| 16 | Monomer of Example 2 and CH₂=CHOCOCH₃ | C / W / C/D | 100 (100) / 100 (110) / 110 (110) | 70 (70) / / 70 (70) | do | do | +81 | 29.37 | 2.00 | 29.61 | 2.10 |
| 17 | Monomer of Example 1 and CH₂=CHOCH₃ | C / W / C/D | 120 (110) / 120 (120) / 120 (120) | 100 (90) / / 100 (90) | do | do | +148 | 27.81 | 1.77 | 27.97 | 1.72 |
| 18 | Monomer of Example 1 and CH₂=CHOCOCH₃ | C / W / C/D | 120 (130) / 120 (120) / 120 (110) | 80 (70) / / 80 (80) | do | do | +142 | 28.13 | 1.73 | 27.17 | 1.32 |
| 19 | Monomer of Example 3 and CH₂=CHOCH₃ | C / W / C/D | 99 (80) / 80 (110) / 90 (110) | 70 / / 70 | do | do | +53 | 30.28 | 2.31 | 31.25 | 2.68 |
| 20 | Monomer of Example 3 and CH₂=CHOCOCH₃ | C / W / C/D | 100 (100) / 90 (100) / 100 (100) | 70 / / 70 | do | do | +52 | 30.55 | 2.26 | 30.24 | 2.26 |
| 21 | Monomer of Example 4 and CH₂=CHOCH₃ | C / W / C/D | 90 (100) / 110 / 90 | 70 (70) / / 80 | do | do | +47 | 31.45 | 2.56 | 31.67 | 2.70 |
| 22 | Monomer of Example 4 and CH₂=CHOCOCH₃ | C / W / C/D | 80 (100) / 100 (100) / 90 (110) | 70 (70) / / 80 (70) | do | do | +45 | 31.68 | 2.51 | 31.58 | 2.69 |
| 23 | Monomer of Example 5 and CH₂=CHOCH₃ | C / W / C/D | 100 / 120 / 110 | 90 / / 90 | do | do | +140 | 28.45 | 1.91 | 28.18 | 2.09 |
| 24 | Monomer of Example 5 and CH₂=CHOCOCH₃ | C / W / C/D | 120 (110) / 110 (120) / 120 (110) | 70 (70) / / 70 (70) | do | do | +143 | 28.76 | 1.87 | 26.51 | 1.63 |
| 25 | Monomer of Example 6 and CH₂=CHOCH₃ | C / W / C/D | 110 / 110 / 110 | 70 / / 70 | do | do | +92 | 29.68 | 2.18 | 29.42 | 2.26 |
| 26 | Monomer of Example 6 and CH₂=CHOCOCH₃ | C / W / C/D | 100 (100) / 100 (110) / 110 (110) | 70 (70) / / 70 (70) | do | do | +94 | 29.96 | 2.13 | 29.58 | 2.12 |
| 27 | Monomer of Example 7 and CH₂=CHOCH₃ | C / W / C/D | 100 (90) / 70 (90) / 100 (90) | 70 / / 70 | do | do | +66 | 30.87 | 2.44 | 31.13 | 2.44 |
| 28 | Monomer of Example 7 and CH₂=CHOCOCH₃ | C / W / C/D | 100 (90) / 80 (80) / 100 (90) | 70 / / 70 | do | do | +62 | 31.12 | 2.39 | 30.81 | 2.55 |
| 29 | Monomer of Example 8 and CH₂=CHOCH₃ | C / W / C/D | 90 / 90 / 100 | 70 / / 70 | do | do | +56 | 32.01 | 2.69 | 32.12 | 2.87 |
| 30 | Monomer of Example 8 and CH₂=CHOCOCH₃ | C / W / C/D | 90 / 70 / 90 | 70 / / 80 | do | do | +57 | 32.23 | 2.63 | 32.09 | 2.77 |

NOTE.—The ratings indicated in parenthesis are obtained employing a blend of 40% copolymer and 60% poly(n-octyl methacrylate).

ple 5 is copolymerized with styrene and vinyl n-perfluorooctanoate respectively using the above procedure, obtaining excellent yields all in excess of 80%.

The polymers are applied to test fabrics from a 2% hexafluoroxylene solution and the repellency values determined. The physical description of the copolymers and the repellency values are shown in Table V.

What is claimed is:
1. A compound of the formula:

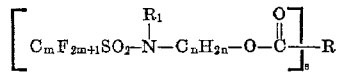

wherein
m is an integer of 3 to 14;

TABLE V

| Example No. | Comonomers | Repellency F | 3-M-Oil Test | AATCC H₂O Test | Appearance of polymer | Differential thermal analysis $T_g$ (° C.) | $T_m$ (° C.) | Elemental analysis Calculated C | H | Found C | H |
|---|---|---|---|---|---|---|---|---|---|---|---|
| 36 | Monomer of Example 5 and CH₂=CHC₆H₅ | C<br>W<br>C/D | 110 (110)<br>120 (100)<br>110 (110) | 80 (80)<br>— — —<br>90 (80) | White brittle | Not distinct | +140 | 31.78 | 2.74 | 32.49 | 2.18 |
| 37 | Monomer of Example 5 and CH₂=CHOCOC₇F₁₅ | C<br>W<br>C/D | 120 (110)<br>130 (110)<br>120 (120) | ——<br>70 ——<br>70 (70) | ——do—— | ——do—— | +110 | 26.95 | 1.28 | 27.78 | 1.62 |

NOTE.—The ratings indicated in parenthesis are obtained employing a blend of 40% copolymer and 60% poly(n-octyl methacrylate).

EXAMPLES 38–40

In each of Examples 38–40, 100 parts of a mixture of bis[2 - (N-ethyl-n-perfluorooctanesulfonamido)ethyl] fumarate, dioctyl fumarate, and methyl vinyl ether in the relative amounts indicated in the following Table VI, 2 parts of 2,2′-azobisisobutyronitrile and 200 parts of hexafluoroxylene are sealed in an ampul under nitrogen and polymerized at 70° C. for 16 hours. The resulting solution terpolymers are then diluted to 10% by weight in hexafluoroxylene and precipitated under vigorous stirring into 20 times the amount of methanol. The polymers are filtered, and dried under vacuum and analyzed. Yields are in excess of 70%.

The terpolymers were then applied to test fabric from solution in the manner previously described. The results of the repellency tests and analytical data are indicated in Table VI.

n is an integer of 2 to 11;
$R_1$ is alkyl having 1 to 4 carbon atoms;
R is an ethylenically unsaturated radical derived from fumaric, maleic, citraconic, mesaconic, itaconic, aconitic, or methylene malonic acid; and
s is an integer of 2 or 3 and is equal to the number of carboxyl groups of the acid from which R is derived.

2. A compound as claimed in claim 1 in which m is 6 to 10.
3. A compound as claimed in claim 1 in which n is 2.
4. A compound as claimed in claim 1 in which $R_1$ is methyl.
5. A compound as claimed in claim 1 in which $R_1$ is ethyl.
6. A compound as claimed in claim 2 in which n is 2.

TABLE VI

| Example No. | Copolymer composition (percent b. wt.)* —[(M₁)(M₃)]ₙ—** | —[(M₂)(M₃)]ₘ—** | F-monomer content (percent b. wt.) | Repellency (2% polymer on fabric) F | 3-M-Oil | AATCC-H₂O | Appearance | Elemental analysis, found C | H |
|---|---|---|---|---|---|---|---|---|---|
| 38 | 62.2 | 37.8 | 59.4 | C<br>W<br>C/D | 80<br>80<br>90 | 70<br>————<br>70 | Soft, white polymer | 44.09 | 5.12 |
| 39 | 48.2 | 51.8 | 46.1 | C<br>W<br>C/D | 80<br>70<br>90 | 50<br>————<br>70 | Soft, tacky polymer | 49.81 | 6.38 |
| 40 | 45.2 | 54.8 | 43.2 | C<br>W<br>C/D | 80<br>60<br>80 | 70<br>————<br>70 | ——do—— | 50.84 | 6.53 |

*Molar ratio of monomers in terpolymers (M₁+M₂) : M₃=1:1.
**M₁: CH—COOCH₂CH₂N(C₂H₅)SO₂C₈F₁₇
       ‖
       CH—COOCH₂CH₂N(C₂H₅)SO₂C₈F₁₇
M₂: CH—COOC₈H₁₇
     ‖
     CH—COOC₈H₁₇
M₃: CH₂=CH—OCH₃.

EXAMPLES 41–45

In Examples 41–45, 2% solutions of the copolymer of bis[2 - (N - methyl-n-perfluorooctanesulfonamido)ethyl] fumarate and methyl vinyl ether of Example 15 are blended in the various ratios shown in the following Table VII and the blends applied to fabric as in the foregoing examples and the repellency ratings determined with the results indicated in Table VII.

TABLE VII

| Example No. | Copolymer of Example 15 | Poly n-octyl methacrylate F | Repellency 3-M-Oil Test | AATCC H₂O Test |
|---|---|---|---|---|
| 41 | 60 | 40 | C 120<br>C/D 120 | 100<br>100 |
| 42 | 15 | 85 | C 110<br>C/D 120 | 90<br>80 |
| 43 | 10 | 90 | C 100<br>C/D 120 | 80<br>90 |
| 44 | 5 | 95 | C 80<br>C/D 100 | 70<br>80 |
| 45 | 2.5 | 97.5 | C 60<br>C/D 60 | 70<br>80 |

7. A compound as claimed in claim 6 in which $R_1$ is ethyl.
8. A compound as claimed in claim 7 in which m is 8.
9. A compound as claimed in claim 8 in which s is 2.
10. A compound as claimed in claim 6 wherein s is 2 and R is derived from fumaric acid.
11. A compound as claimed in claim 6 wherein s is 2 and R is derived from itaconic acid.
12. A compound as claimed in claim 1 which is bis- [2 - (N - ethyl - n - perfluorooctanesulfonamido)ethyl] fumarate.
13. A compound as claimed in claim 1 which is bis- [2 - (N - methyl - n - perfluorooctanesulfonamido)ethyl] fumarate.
14. A compound as claimed in claim 1 which is bis- [2 - (N - n - propyl - n - perfluorooctanesulfonamido) ethyl] fumarate.

15. A compound as claimed in claim 1 which is bis-[2 - (N - n - butyl - n - perfluorooctanesulfonamido)ethyl] fumarate.

16. A compound as claimed in claim 1 which is bis-[2 - (N - ethyl - n - perfluorooctanesulfonamido)ethyl] itaconate.

17. A compound as claimed in claim 1 which is bis-[2 - (N - methyl - n - perfluorooctanesulfonamido)ethyl] itaconate.

18. A compound as claimed in claim 1 which is bis-[2 - (N - n - propyl - n - perfluorooctanesulfonamido)ethyl] fumarate.

19. A compound as claimed in claim 1 which is bis-[2 - (N - n - butyl - n - perfluorooctanesulfonamido)ethyl] fumarate.

References Cited

UNITED STATES PATENTS

| | | | |
|---|---|---|---|
| 2,803,656 | 8/1957 | Ahlbrecht et al. | 260—485 F |
| 3,078,245 | 2/1963 | Heine | 260—556 F |

FOREIGN PATENTS

| | | | |
|---|---|---|---|
| 1,011,976 | 12/1965 | Great Britain | 260—556 |

JAMES A. PATTEN, Primary Examiner

E. J. SKELLY, Assistant Examiner

U.S. Cl. X.R.

117—124, 126, 132, 138.8, 142, 148, 155, 161; 260—78.4 E, 78.5 BB, 556 F, 900, 901